United States Patent [19]
Elliott

[11] Patent Number: 5,359,987
[45] Date of Patent: Nov. 1, 1994

[54] GUIDE BAR FOR STONE SLAB SAW

[76] Inventor: Brian D. Elliott, P.O. Box 756, 3326 Mitchell Rd., Bedford, Ind. 47421

[21] Appl. No.: 179,980

[22] Filed: Jan. 11, 1994

[51] Int. Cl.⁵ .................... B28D 1/08; B28D 1/12
[52] U.S. Cl. ............................... 125/21; 451/311
[58] Field of Search ......... 125/21; 51/135 R, 135 BT, 51/148; 83/651.1, 661

[56] References Cited

U.S. PATENT DOCUMENTS

| | | | |
|---|---|---|---|
| 1,043,433 | 11/1912 | Jackson | 125/21 |
| 2,702,538 | 2/1955 | Burkhardt | 125/21 |
| 5,181,503 | 1/1993 | Fish et al. | 125/21 |

FOREIGN PATENT DOCUMENTS

| | | | |
|---|---|---|---|
| 0942018 | 4/1956 | Germany | 125/21 |
| 0948768 | 9/1956 | Germany | 125/21 |
| 2154428 | 5/1973 | Germany | 125/21 |

*Primary Examiner*—Robert A. Rose
*Attorney, Agent, or Firm*—Scott R. Cox

[57] ABSTRACT

A stone slab saw with multi-sectional guide bar comprised of a support frame, a continuous flexible belt supported by a multi-sectional guide bar system preferably comprised of an upper and lower guide bar, a wear strip secured in a slot in the lower guide bar, guide bar supports at each end of the upper and lower guide bars for securing the guide bars to the support frame and a primary and secondary tension adjustment elements for adjusting the tension of the upper and lower guide bars.

11 Claims, 3 Drawing Sheets

GUIDE BAR FOR STONE SLAB SAW

BACKGROUND OF INVENTION

1. Field of Invention

This invention relates to stone cutting equipment. In particular, this invention discloses a multi-sectional guide bar for supporting a continuously flexible saw belt of a stone slab saw.

2. Prior Art

Removing stone from the ground and then cutting that stone into desired shapes and thicknesses is a difficult task. Wire saws having an endless configuration have often been used to cut large blocks of stone into smaller sections. In particular, stone slab saws with a continuous flexible belt have been designed for this task, for example as disclosed U.S. Pat. No. 5,181,503. That patent describes a stone slab saw having a continuous flexible belt drivingly mounted to a plurality of sheaves rotatably mounted to a frame. The frame is vertically moveable by a pair of racks and pinions driven by a motor so that the belt can cut the stone as it is moved vertically downward through the stone. The belt usually includes a plurality of abrasive pad holders mounted thereto with each holder including an abrasive pad having an outwardly facing abrasive surface. To keep the belt cutting in a straight line, a one-piece guide bar is mounted to the frame to support the belt. That bar is placed under tension to provide rigid backing for the saw belt as it is driven and while it cuts through the block of stone. While the cutting of the stone is occurring and the saw is passing through the stone, a lubricant is emitted through passageways in the guide bar to facilitate the movement of the saw belt through the stone.

A similar device for cutting a block of stone containing a frame and a continuous flexible belt is also disclosed in German Patent No. 2,154,428.

Pivoting belt configured saws for cutting slots into stone are disclosed, for example, in U.S. Pat. Nos. 4,945,889, 4,679,541 and 4,971,022. Other types of belt-configured saws for cutting slots in stone or for cutting materials using an abrasive band are disclosed, for example in U.S. Pat. Nos. 4,603,678 and 2,362,979.

Once the block of stone has been removed from the ground, the task of cutting the stone into sections or slices using a stone slab saw can be quite difficult because of the requirement of a straight cut. When such a cut is demanded, it is important that the saw belt pass smoothly and precisely through the stone without deflection. A guide bar to support a continuous saw belt is designed to keep the saw belt in line. In addition, the guide bar as it passes through the stone must also provide a significant amount of lubricant, such as water, to the surface of the stone being cut. Further, to permit the cut of the stone to be precise without excessive wear on the saw belt, the cross section of the saw belt must be kept narrow by placement of significant tension on the guide bar.

Despite the existence of prior devices using guide bars to support a saw belt, there is still a need for improved guide bars to support saw belts which will increase the accuracy of the cut of the stone and reliability of the equipment. Further, these guide bars should be easy to manufacture and install, inexpensive and capable of being placed under significant tension to maintain a precise cross section.

Therefore, it is an object of this invention to provide an improved stone slab saw with a multi-sectional guide bar system.

It is a still further object of this invention to provide a stone slab saw with a multi-sectional guide bar system providing means for adjustment of the tension of each guide bar of the system.

It is a still further object of this invention to provide a stone slab saw with a multi-sectional guide bar system wherein the tension of each of the guide bars of the multi-sectional guide bar system is independently adjustable.

It is a still further object of this invention to provide a stone slab saw with a multi-sectional guide bar system which is easy to manufacture and assemble.

These and other objects and features of the present invention will become apparent to those skilled in the art from a consideration of the following detailed description, drawings and claims. The description, along with the accompanying drawings, provides a selected example of construction of the device to illustrate the invention.

SUMMARY OF THE INVENTION

In accordance with the present invention there is provided an improved stone slab saw with a multi-sectional guide bar comprised of a cutting frame, a continuous flexible belt movably mounted to the cutting frame wherein said belt includes an outwardly facing abrasive surface for engaging and cutting a block of stone, and a multi-sectional guide bar system secured to said cutting frame, preferably comprised of a first and second guide bar, wherein said second guide bar contains a slot in its lower edge, a wear strip inserted in said slot in said lower edge wherein the insertion of the wear strip into the slot creates a passageway for a lubricant, and wherein said wear strip contains lubricant ports; guide bar supports to secure the guide bar to the cutting frame; and tension adjustment mechanisms for adjusting the tension of the guide bars of the guide bar system.

This improved stone slab saw with multi-sectional guide bar system permits the efficient and accurate cutting of stone with reduced damage to the saw belt and reduced deformation of the guide bars of the guide bar system while in use.

BRIEF DESCRIPTION OF THE DRAWINGS

This invention will now be described with reference to the accompanying drawings in which.

DETAILED DESCRIPTION OF PREFERRED EMBODIMENT

Figure 1:
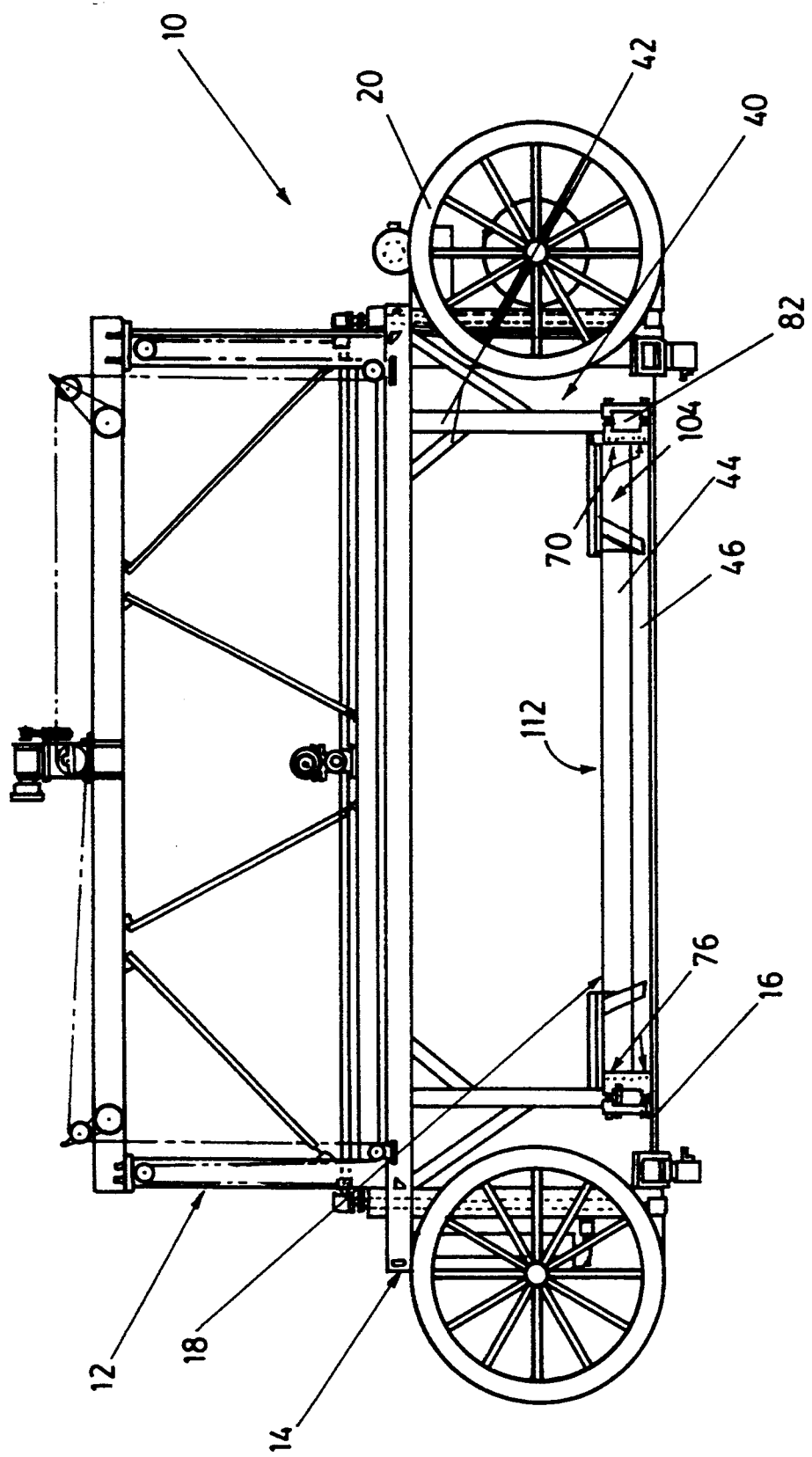
FIG. 1 is a side view of the stone slab saw.

Although the invention is adaptable to a wide variety of uses, particularly for the cutting of a block of stone or for the cutting of other hardened materials, it is shown in the drawings for purpose of illustration as embodied in a stone slab saw (10) with a multi-sectional guide bar system comprised of a gantry saw frame (12), a cutting frame (14) which supports a continuous flexible saw belt (16), and a multi-sectional guide bar system (18) for supporting the continuous flexible saw belt (16) wherein said guide bar system contains a tension adjustment mechanism for adjusting the tension of the multi-sectional guide bars.

The stone slab saw (10) includes the gantry saw frame (12) which travels horizontally on a rail system (not shown). The block of stone rests upon a section of the gantry saw frame (12) which has a plurality of wheels rotatably mounted thereto. The wheels in turn are rollingly engaged with rails to allow the gantry saw frame and stone block to be rolled beneath the stone slab saw. The gantry saw frame is driven by a rack gear and pinion system. This system has a gear motor which is connected to line shafts which are themselves connected to the pinion gears to move the gantry saw frame along the rail system.

The stone slab saw includes the cutting frame (14). The cutting frame travels vertically and is driven by either a cable system or a ball feed screw system. The cutting frame has rotatably mounted thereon a pair of belt tensioning sheaves (20). The continuous saw belt (16) is mounted to the sheaves and is driven or pulled by a means of an electric motor/belt combination to cut a slot into the stone block as the saw is lowered downwardly. See FIG. 1. The cutting frame for the stone slab saw can be, for example, that which is disclosed in U.S. Pat. No. 5,181,503, which is incorporated by reference.

Any conventional mechanism can be used to move the cutting frame which supports the saw belt and the multi-sectional guide bar system up and down. Preferably, this method is a ball feed screw system. The ball feed screw system is fixed at both the top and the bottom of the cutting frame of the saw. When the ball feed screw system is driven, a plate which is attached to the ball feed screw system is moved up and down. This plate is secured to the cutting frame to support the multi-sectional guide bar system as well as the continuous flexible belt.

The cutting frame (14) also contains guide wheels which provide for accurate travel of the gantry saw frame. There is a main drive shaft which is powered by an electric motor. Mounted to the drive shaft is a drive wheel which is machined out to accommodate a wear lining. The wear lining runs against and grips the cutting belt. On the opposite end of the drive wheel is the idler wheel which is similar in construction to the drive wheel.

Attached to the cutting frame is the support frame (40) for the multi-sectional guide bars. The support frame (40) for the multi-sectional guide bar is secured to the cutting frame (14). It consists of a number of sturdy tubing elements (42) which are produced from heavy duty steel or other such material. These tubing elements are fixedly secured to the cutting frame (14) in such a manner as to fully support the multi-sectional guide bar system (18). It is critical that these members of the support frame be thoroughly secured as they provide the support for the tensioning elements of the multi-sectional guide bar system. Any system which will securely fasten the elements of the support frame is acceptable. Specific choice as to location and attachment of these members is not critical and is dependent upon the choice of gantry saw frame (12) which is associated with the multi-sectional guide bar system (18).

Mounted to the support frame is the multi-sectional guide bar system (18). The multi-sectional guide bar system (18) is preferably comprised of a pair of guide bars (44, 46), guide bar supports at each end of the guide bars and tension adjustment elements secured to the guide bar supports to place tension on each of the guide bars. Preferably, the guide bar system utilizes two separate guide bars, although three or more separate guide bars may be used as appropriate. It has been determined that the preferred embodiment utilizes a pair of guide bars, an upper (44) and a lower (46) guide bar. While the guide bars are approximately the same length and thickness and are supported by the support frame, their width varies, with one of the guide bars preferably about twice the width of the other guide bar. This difference in width permits varying tensions to be placed upon each of the guide bars and provides greater strength to the overall guide bar system at a reduced cost over a conventional single bar guide bar system. The use of multiple guide bars to replace a single guide bar, as is disclosed in U.S. Pat. No. 5,181,503, provides flexibility in the construction of the guide bar support system as well as reducing its overall cost. When multiple guide bars are used they will fit into the same location as a single guide bar but can be constructed individually at a greatly reduced cost.

It is well understood that different width guide bars which are the same length and thickness will have different deformation characteristics. The wider the guide bar, the more resistance there is to deformation of the guide bar. Thus, if the same tension is placed on two guide bars, the narrower of the two guide bars will tend to deform a more than the wider guide bar when in use. While a single guide bar will have only one deformation characteristic, there are other inherent problems associated with use of the single guide bar. These include difficulty in achieving sufficient tension when one very wide guide bar is used because the inherent structural instability as a result of the large overall width of the single guide bar. Deformation characteristics will vary within the single guide bar because of the manner in which the guide bar is designed. The weight of a single guide bar is also a problem. If the single guide bar is made in two pieces, the complexity of the structure of the bar and the difficulty of manufacture produces a guide bar with inconsistent deformation characteristics. Thus, the utilization of two or more guide bars with varying widths is a critical improvement over prior art single bar guide bar systems.

Figure 3:
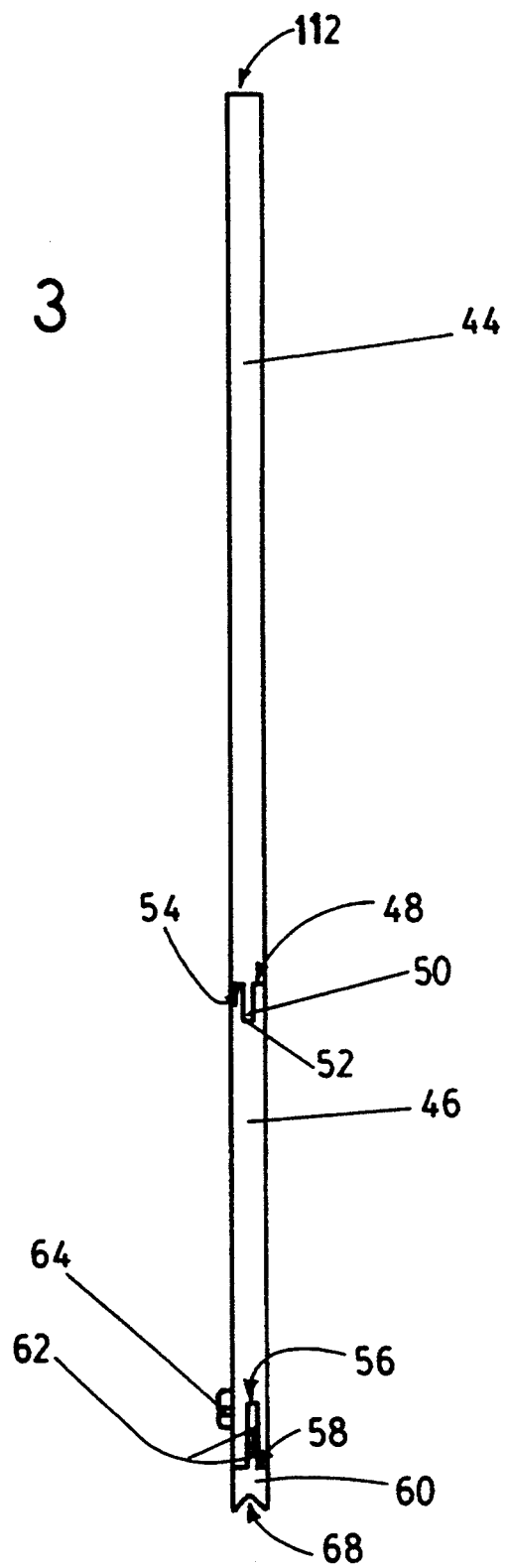
FIG. 3 is an end view of the upper and lower guide bars with wear strip.

Preferably, one of the guide bars is from about 4 to about 8 inches in width with the second guide bar from about 8 to about 16 inches in width. Preferably, the larger of the two guide bars is mounted on top of the smaller guide bar. See FIG. 3. The lower edge (48) of the upper guide bar has an extended tongue (50) which fits within a slot (52) in the upper edge (54) of the lower guide bar. Preferably, this tongue (50) will extend $\frac{1}{2}$ to about $1\frac{1}{2}$ inch from the lower edge (48) of the upper guide bar and will fit comfortably, but not tightly, within the slot (52) in the upper edge (54) of the lower guide bar. The guide bars can be produced from any sturdy material such as high quality steel or aluminum. The lower guide bar (46) also has a slot (56) in its lower edge (58) which extends about 1 to about 3 inches up into the body of the lower guide bar. Inserted within this slot is a wear strip (60). While a portion of the wear strip (60) extends upward into the slot of the lower guide bar, a lubricant channel (62) is left in the slot (56) above the wear strip, with said lubricant channel (62) being about 1 to about 2 inches in height and about 1/16 to about $\frac{1}{2}$ inch in width. This lubricant channel (62) is used for the passage of a lubricant, which is preferably water, through the lubricant channel in the lower guide bar (46) above the wear strip (60) when the saw is in use. Lubricant openings (64) are provided vertically up through the wear strip into the lubricant channel of sufficient size and frequency to permit sufficient lubricant to flow through these lubricant openings and through the wear strips to lubricate the saw belt when it is in use. The water or other lubricant enters the lubricant channel, preferably through a hose attached to an outside opening in the lower guide bar near the side edge of the lower guide bar. Water is pumped through this water channel by conventional means. The wear strip (60) is secured within the channel in the lower edge of the lower guide bar (46) by bolts or screws passing through the sides of the lower guide bar and through the inserted lip of the wear strip to hold it securely in place. The wear strip (60) is constructed preferably of an alloy steel or a work hardening steel.

The wear strip (60) has a downward opening (68), generally an inverted v-shaped recess into which the continuous flexible saw belt (16) will fit. The flexible belt can be any conventional flexible saw belt. For example, the flexible belt may include a plurality of metal mounting blocks having a pair of holes extending therethrough. A pair of continuous cables extend through these holes with the cables providing continuous flexible elongated members extending through the belt and the mounting block providing strength to the belt. The mounting block generally may have a five-sided configuration with two of the sides forming an inverted v-shaped top to conformingly fit within the downward inverted recess of the wear strip. A plurality of abrasive pads are fixedly secured to the bottom surface of the saw belt by a suitable means such as brazing.

Mounting blocks are spaced along the length of the belt. The abrasive pad is fixedly secured to the bottom surface of the mounting block and extends outwardly over the sides of the mounting block. The length of each pad is shorter than the length of the mounting blocks. Once the abrasive pads are secured to the mounting blocks and the cables are extended through the mounting blocks, the entire combination is then placed within a mold to form the plastic main body of the belt. A conventional electric motor is mounted to the cutting frame and includes a rotatable output shaft having a sheave mounted thereto. The sheave engages and drives the belt which drivingly engages a sheave mounted to the axle. Thus, by operation of the motor, a sheave is caused to rotate the saw belt about the guide bar through the generally inverted v-shape recess in the wear strip.

Figure 2:
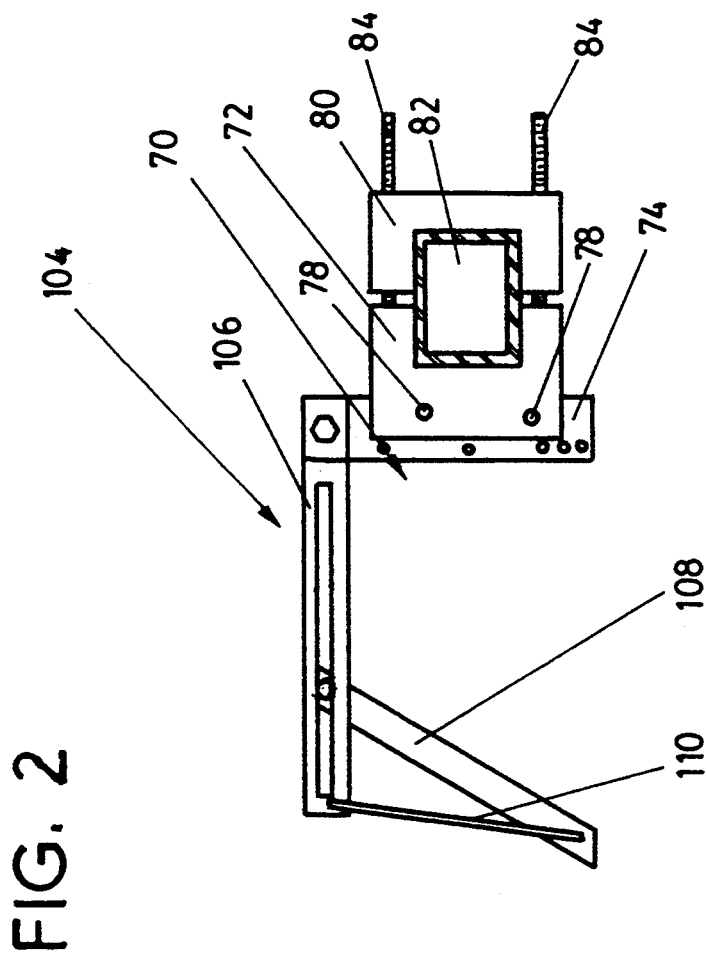
FIG. 2 is a side view of the guide bar system.
Figure 2:
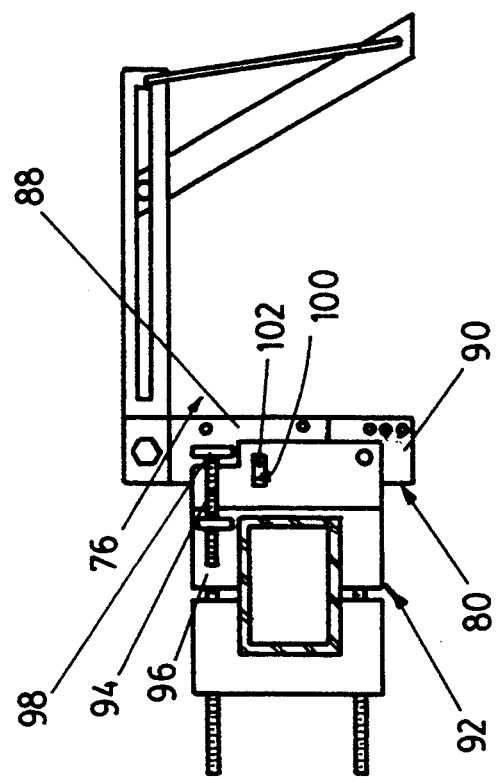

The multi-sectional guide bar system, preferably two separate guide bars, is mounted to the cutting frame (14) so that each of the guide bars (44, 46) are under a controlled amount of tension. A variety of attachment methods may be utilized to attach the guide bars to the cutting frame and at the same time place tension on the guide bars. In one embodiment, the pair of guide bars are secured to guide bar supports of the support frame. See FIG. 2. While the guide bar supports are similar at each end of the guide bars, one end is preferably modified to permit selective adjustment of the tension of each of the guide bars. In a preferred embodiment, the first end (70) of each of the guide bars is secured to a first c-shaped support bracket (72). This first c-shaped bracket is secured to both upper and lower guide bars by conventional means, such as bolts, screws or other systems. In one preferred embodiment the first c-shaped bracket (72) has an internal slot (not shown) which slides up and down on an extended lip (not shown) built onto the guide bar near the end of each guide bar. The first c-shaped bracket with internal slots slides up and down on an extended lip which is built onto a guide bar support bar (74) which is secured to the ends of the guide bars. The guide bar support bar (74) is secured to the ends of the guide bars by conventional means such as screws or bolts passing through both the guide bar support bar (74) and the ends of the guide bars (70, 76). The first c-shaped bracket slides up and down on the lip and is held in a precise location by a pin (78) or pins which pass through both the first c-shaped bracket (72) and the end of one of the guide bars. Preferably a pin or pins are inserted through both the c-shaped bracket (72) and the guide bars, one in the center of the width of each of the bars. See FIG. 2. Associated with each of the arms of the first c-shaped bracket are arms of a second c-shaped bracket (80) which are placed facing in the opposite direction from the arms of the first c-shaped bracket (72). In the rectangular opening created by the arms of the two mirror image c-shaped brackets is a tubing element (82) which is fixedly secured to the support frame (40) by any conventional means such as by welding or bolts. The tubing element (82) can be produced from conventional steel sections. However, it is critical that this tubing element (82) provide good support for the c-shaped support brackets (72, 80) as this permits tension to be placed on the guide bar. Passing through the arms of both the first and second c-shaped brackets are tension adjustment bolts (84). These bolts are attached through the arms of the first c-shaped bracket (72) through turned openings and pass through openings within the arms of the second c-shaped bracket (80) such that as these bolts are rotated, they will pull the first c-shaped bracket (72) toward the tubing element (82) and toward the second c-shaped bracket (80). The second c-shaped bracket (80) does not itself move relative to the tubing element (82) as it is fixedly placed against the tubing element (82). As the bolts are turned, the effect is to pull the guide bars thus placing increasing tension on the support bars.

The guide bar support system at the opposite end of the support bars is similar in construction to that at the first end with one major distinction. Secured to the end of the guide bars is a second guide bar support bar (86). This guide bar support bar is once again secured to the ends (76) of the two guide bars by welding, bolts or screws passing through both the second guide bar support bar (86) and the ends of the guide bars. However, this guide bar support bar is split such that the upper guide bar (44) is separately connected to upper portion (88) of the second guide bar support bar from where it attaches to the lower guide bar thus forming two separate pieces of the second guide bar support bar, an upper portion (88), and a lower portion (90). This permits the upper guide bar (44) to be tensioned at a different degree of tension from that of the lower guide bar (46). See FIG. 2.

In addition, there is secured to the top arm (96) of the first c-shaped bracket (92) of the second side a third adjustment bolt (94) with appropriate bracket such that as a result of the split in the guide bar support bar, additional tension can be placed on the upper guide bar (44) without modifying the existing tension on the lower guide bar (46). This additional tension is created by the third adjustment bolt (94) being secured both to the top arm (96) of the first c-shaped bracket of the second side and, at its opposite end secured to the upper portion (88) of the guide bar support bar at on guide bar support bar bracket (98). Thus, as the tension on the top arm (96) of the first c-shaped support frame of the second side is increased, it will pull on the guide bar support bar bracket (98) which is secured to the second guide bar support bar (86) thus putting increased tension on the upper guide bar (44). This third tension adjustment element is important because of the difference in width of the two guide bars. The narrower of the two guide bars has a tendency to deform and bend under pressure. By providing additional tensioning capability to the narrower of the two guide bar, additional stiffening of the overall guide bar system can be provided. The amount of additional tensioning providing by this third adjustment bolt (94) is limited to a certain extent by a combination slit (100) and pin (102) which pass through the first c-shaped bracket of the second side (92). This slit (100) is horizontal and is located approximately in the middle of the upper portion of the first c-shaped bracket of the second side (52). See FIG. 2. The pin (102) passing through that slot (100) is secured to the second guide bar support bar (86). By this mechanism the tension on the upper support bar (44) can be adjusted to be different from that on the lower bar (46). A similar pin is centered through the first c-shaped bracket of the second side and the lower portion of the second guide bar support bar to secure the lower guide bar (46) to the lower portion of the first c-shaped support frame of the second side in a manner similar to that on the opposite end of the support frame.

To assure a limitation on movement of this lower portion of the second guide bar support bar (90), the pin passes through an opening in the lower portion of the second guide bar support bar of approximately the same size as is the pin.

Also secured to and attached at each end of the upper guide bar is preferably a guide bar stiffener (104) which is comprised of a horizontal slotted piece (106), a diagonal stiffener (108) and a gusset (110). The horizontal slotted piece (106) extends from the end of the upper guide bar along the upper edge (112) of the upper guide bar approximately a tenth of the way across the upper guide bar. A slot is placed within this horizontal slotted piece in which the upper end of a diagonal stiffener (108) is secured. A diagonal stiffener of the same type is provided on the opposite end of the guide bar. The diagonal stiffener (108) is extended diagonally across both guide bars until it reaches the wear strip. Secured to this bottom end of the diagonal stiffener is the gusset (110) or arm piece which will extend upward onto the top of the slotted piece (106) and over and down the opposite side of the guide bars to attach on the backward side of the guide bars to a second diagonal stiffener (not shown). By securing these diagonal stiffeners (108) securely against the surface of the guide bars, additional support is provided for the guide bars especially when the diagonal stiffeners are made of sturdy, relatively non-flexible heavy grade steel.

In operation, the guide bars (44, 46) are secured in place to their respective c-shaped brackets (72, 92). The tension adjustment bolts (84) are tightened to place tension on the guide bars. Additional tension is then placed to the upper guide bar (44) by adjustment to the third tension adjustment bolt (94). The guide bar with continuous flexible belt is secured in place to the cutting frame (14), which is placed above a block of stone. After the saw is turned on, the continuous flexible belt (20) will then cut through the stone vertically until the stone is completely cut. The tension adjustment bolts (84, 94) hold the guide bars securely in place, eliminating the structural instability and deformation that has been present in prior art cutting bars. Further, the guide bar stiffener (104) provides additional support for the guide bars. This results in more accurate cutting and less structural damage to the saw belt.

I claim:

1. A stone slab saw with multi-sectional guide bars comprised of:
   (a) a cutting frame,
   (b) a guide bar system comprised of an upper and lower guide bar wherein the upper guide bar has a tongue extending downward to be placed within a slot in an upper edge of the lower guide bar, a wear strip which fits within a slot in a lower edge of the lower guide bar, guide bar supports for securing the guide bar to the cutting frame including a pair of guide bar tension adjustment bolts at one end of the upper and lower guide bars and a third adjustment bolt for independently adjusting the tension of one of the guide bars, and
   (c) a continuous flexible saw belt supported by the guide bar system.

2. The stone slab saw with multi-sectional guide bars of claim 1 wherein the guide bar supports for securing the guide bar to the cutting frame is comprised of a first c-shaped bracket secured to the guide bars, a tubing element secured to the cutting frame, a second c-shaped bracket and a pair of guide bar tension adjustment bolts passing through the first and second c-shaped brackets.

3. The stone slab saw with multi-sectional guide bars of claim 2 wherein the guide bar supports also include a second pair of c-shaped brackets secured to the cutting frame at the opposite end of the first set of the c-shaped brackets wherein one of the set of c-shaped brackets is split into two portions wherein a first portion of said c-shaped bracket can move independently of a second portion of the first c-shaped element.

4. The stone slab saw with multi-sectional guide bars of claim 1 wherein there is also secured to the guide bars a guide bar stiffener comprised of a horizontal slotted piece, a diagonal stiffener and a gusset.

5. The stone slab saw with multi-sectional guide bars of claim 1 wherein the upper guide bar is at least twice the width of the lower guide bar.

6. The stone slab saw with multi-sectional guide bars of claim 1 wherein the slot in the lower edge of the lower guide bar contains a lubricant channel.

7. The stone slab saw with multi-sectional guide bars of claim 6 wherein the wear strip has openings passing there through for lubricants.

8. The stone slab saw with multi-sectional guide bars of claim 1 wherein the wear strip has an inverted v-shaped opening along the length of the guide bar into which the continuous flexible saw belt can pass.

9. The stone slab saw with multi-sectional guide bars of claim 1 wherein the guide bar supports include a guide bar support bar which is secured to the ends of the upper and lower guide bar.

10. The stone slab saw with multi-sectional guide bars of claim 2 wherein the guide bar supports include a guide bar support bar which is secured to the ends of the upper and lower guide bar.

11. The stone slab saw with multi-sectional guide bars of claim 9 wherein the guide bar support bar on one side of the guide bars is split into two portions wherein a first portion of said guide bar support bar is attached to the upper guide bar and the second portion is attached to the lower guide bar.

* * * * *